United States Patent
Oyamada et al.

(10) Patent No.: US 12,489,330 B2
(45) Date of Patent: Dec. 2, 2025

(54) COIL WINDING PORTION STRUCTURE FOR STATOR

(71) Applicant: MIKUNI CORPORATION, Tokyo (JP)

(72) Inventors: Kan Oyamada, Takizawa (JP); Jun Takahashi, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 292 days.

(21) Appl. No.: 18/143,858

(22) Filed: May 5, 2023

(65) Prior Publication Data
US 2023/0369931 A1   Nov. 16, 2023

(30) Foreign Application Priority Data
May 12, 2022   (JP) .................................. 2022-078789

(51) Int. Cl.
*H02K 3/28* (2006.01)
*H02K 3/34* (2006.01)
*H02K 5/22* (2006.01)

(52) U.S. Cl.
CPC ................. *H02K 3/28* (2013.01); *H02K 3/34* (2013.01); *H02K 5/225* (2013.01)

(58) Field of Classification Search
CPC ............ H02K 3/28; H02K 3/32; H02K 3/325; H02K 3/34; H02K 3/345; H02K 3/50; H02K 3/52; H02K 3/521; H02K 3/522; H02K 5/225
See application file for complete search history.

(56) References Cited

U.S. PATENT DOCUMENTS

2005/0088049 A1 *   4/2005   De Filippis ............ H02K 3/522
                                                                310/71

FOREIGN PATENT DOCUMENTS

JP          2019-41549 A       3/2019

* cited by examiner

*Primary Examiner* — Eric Johnson
(74) *Attorney, Agent, or Firm* — STAAS & HALSEY LLP (57) ABSTRACT

In a motor unit that includes a stator including coils, a rotor, and an insulator attached to the stator, the insulator includes a bobbin portion around which a first coil wire or a second coil wire is wound, and a tubular portion provided outside the bobbin portion in a radial direction, terminals to which the first coil wire and the second coil wire are connected being mounted on the tubular portion, the tubular portion includes, at an upper end thereof between the coils and the terminals, base portions and guide portions receiving a load of the first coil wire or the second coil wire when the first coil wire or the second coil wire is wound in the coils such that the base portions and the guide portions are aligned in a circumferential direction.

11 Claims, 5 Drawing Sheets

COIL WINDING PORTION STRUCTURE FOR STATOR

CROSS REFERENCE TO RELATED APPLICATIONS

This application claims priority benefit from Japanese Patent Application No. 2022-078789 filed on May 12, 2022, the contents of which are incorporated herein by reference.

BACKGROUND OF THE INVENTION

Field of the Invention

The present invention relates to a winding portion structure of a coil provided in a stator included in an actuator such as an electric motor.

Description of the Related Art

Many electric rotary actuators such as electric motors have a structure including, for example, a stator and a rotor provided to be rotatable with respect to the stator, including a coil serving as an electromagnet in the stator, and including a permanent magnet in the rotor. Such electric rotary actuators including a stator and a rotor are categorized into an outer rotor type with the rotor disposed outside the stator, and an inner rotor type with the rotor disposed inside the stator.

For example, Japanese Patent Laid-Open No. 2019-41549 discloses a three-phase (a U phase, a V phase, and a W phase) motor of the inner rotor type that includes, in a tubular stator, six teeth projecting inward, forms a coil by winding a wire (covered wire) around each tooth, and thus has a plurality of coils for each phase.

In the configuration according to the above document, an end of the winding around the coil is extended further outward than an outer peripheral portion of the stator and is connected to a terminal of a wiring of each phase disposed further outward in a radial direction than the outer peripheral portion of the stator. However, the outer shape of the entire motor increases in such a configuration in which the terminal is disposed to project to the outside of the stator.

Also, in the configuration according to the above document, the end of the winding is hooked on and connected to a flat plate-shaped terminal. However, it is necessary to apply a tensile force to the winding to some extent by a winding machine, for example, when the winding is wound in the coil at the time of creating the motor. Therefore, there is a concern that the tensile force of the winding applied by the winding machine may be applied to the terminal when the winding is connected to the terminal at the time of starting and ending the winding around the coil and this may lead to deformation of the terminal.

SUMMARY OF THE INVENTION

The present invention was made in view of such a problem and provides a winding portion structure for a stator that reduces a load to be applied to a terminal to which a winding is connected with the winding strongly wound in a coil provided in an inner rotor-type stator and that has a structure of a winding support portion in a compact size.

In order to achieve the above object, a coil winding portion structure for a stator according to the present invention is a coil winding portion structure for a stator in an electric motor that includes the stator including coils with windings wound therein, a rotor rotatably disposed inside the stator, and an insulator attached to the stator for insulating the coils, in which the insulator includes a coil wound portion around which the windings are wound, and a tubular portion provided outside the coil wound portion in a radial direction, connection terminals to which the windings are connected being mounted on the tubular portion, the tubular portion includes, between the coils and the connection terminals, a load receiving portion receiving a load of the windings when the windings are wound in the coils, the load receiving portion includes base portions holding the windings with the windings mounted thereon such that the windings extend along a part of the tubular portion in a circumferential direction, and guide portions provided between the coil wound portion and the base portions and bending and guiding the windings, and the connection terminals, the base portions, and the guide portions are disposed at an end of the tubular portion in an axial direction in an aligned manner in the circumferential direction.

Preferably, the guide portions and the base portions are disposed in order from a side of the coil wound portion between the coil wound portion and the connection terminals at positions in the circumferential direction of the tubular portion.

Preferably, the base portions and the guide portions are configured integrally with the tubular portion, and the connection terminals are supported at the end of the tubular portion in the axial direction.

Preferably, the coils include V-phase, U-phase, and W-phase coils, the windings include a first coil wire forming the V-phase and U-phase coils and a second coil wire forming the W-phase coils, the connection terminals include three end connection terminals individually locking one end of the first coil wire, the other end of the first coil wire, and one end of the second coil wire, and one intermediate connection terminal locking an intermediate portion of the first coil wire and the other end of the second coil wire, and the three end connection terminals and the intermediate connection terminal are disposed at the tubular portion at different positions in the circumferential direction.

Preferably, the base portions are provided at respective positions where the three end connection terminals and the intermediate connection terminal are mounted.

Preferably, the base portion where the intermediate connection terminal is mounted includes the guide portions on both sides of a connecting position between the intermediate connection terminal and the first coil wire in the circumferential direction with the connecting position sandwiched therebetween.

Preferably, the guide portions are formed into columnar shapes projecting in the axial direction of the tubular portion from the base portions, and one of the two guide portions provided at the base portion where the intermediate connection terminal is mounted has a longer projecting length than the other.

According to the coil winding portion structure for a stator of the present invention, the tubular portion of the insulator includes, between the coils and the connection terminals, the load receiving portion receiving a load of the windings at the time of winding around the coil wound portion, and it is thus possible to strongly wind the coil wires at the time of the winding around the coil wound portion and to reduce a load to be applied to the connection terminals.

Particularly, the load receiving portion includes the base portions holding the windings with the windings mounted thereon such that the windings extend along a part of the tubular portion in the circumferential direction, and the guide portions provided between the coil wound portion and the base portion and bending and guiding the windings, and the connection terminals, the base portions, and the guide portions are disposed at the end of the tubular portion in the axial direction in an aligned manner in the circumferential direction, and it is thus possible to configure the load receiving portion in a compact size.

DETAILED DESCRIPTION OF THE PREFERRED EMBODIMENTS

Hereinafter, an embodiment of the present invention will be described on the basis of drawings.

Figure 1:
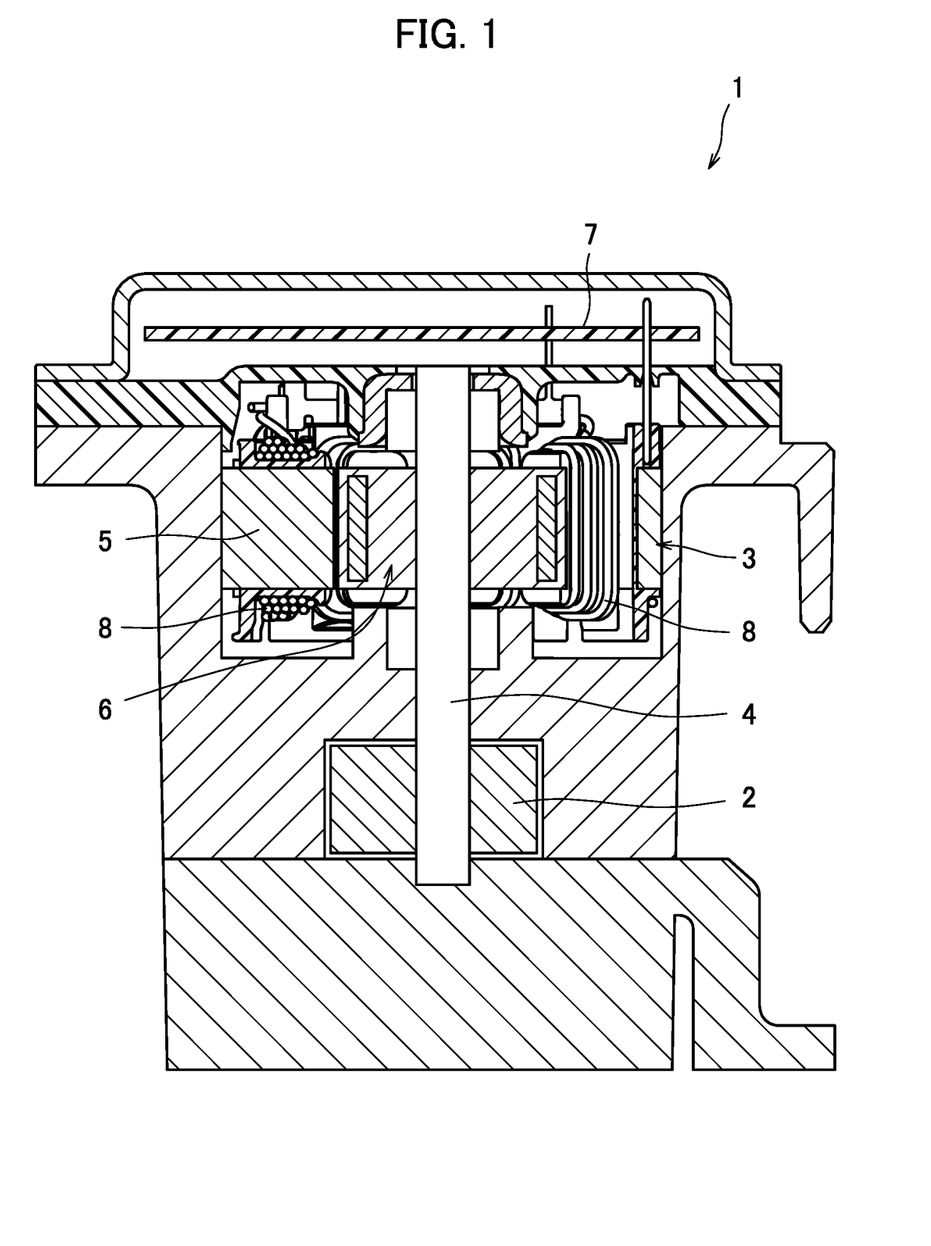
FIG. 1 is a longitudinal sectional view of an electric pump device that employs a winding portion structure according to an embodiment of the present invention.

FIG. 1 is a longitudinal sectional view of an electric pump device 1 that employs a winding portion structure according to an embodiment of the present invention.

The electric pump device 1 includes a pump unit 2 and a motor unit 3.

The pump unit 2 is, for example, a trochoid pump and is driven by rotation of an input shaft (inner shaft 4).

The motor unit 3 is an inner rotor-type brushless electric motor including a rotor 6 that is rotatably provided inside a stator 5.

The inner shaft 4 that is the input shaft of the pump unit 2 also functions as an output shaft of the motor unit 3.

Note that the following description will be given on the assumption that the axial line direction of the inner shaft 4 is an up-down direction and the motor unit 3 is disposed above the pump unit 2.

A control unit 7 that controls the motor unit 3 is included on an upper side of the motor unit 3 that is a side opposite to the pump unit 2. The control unit 7 controls a current to be input to coils 8 of each phase in the motor unit 3.

Figure 2:
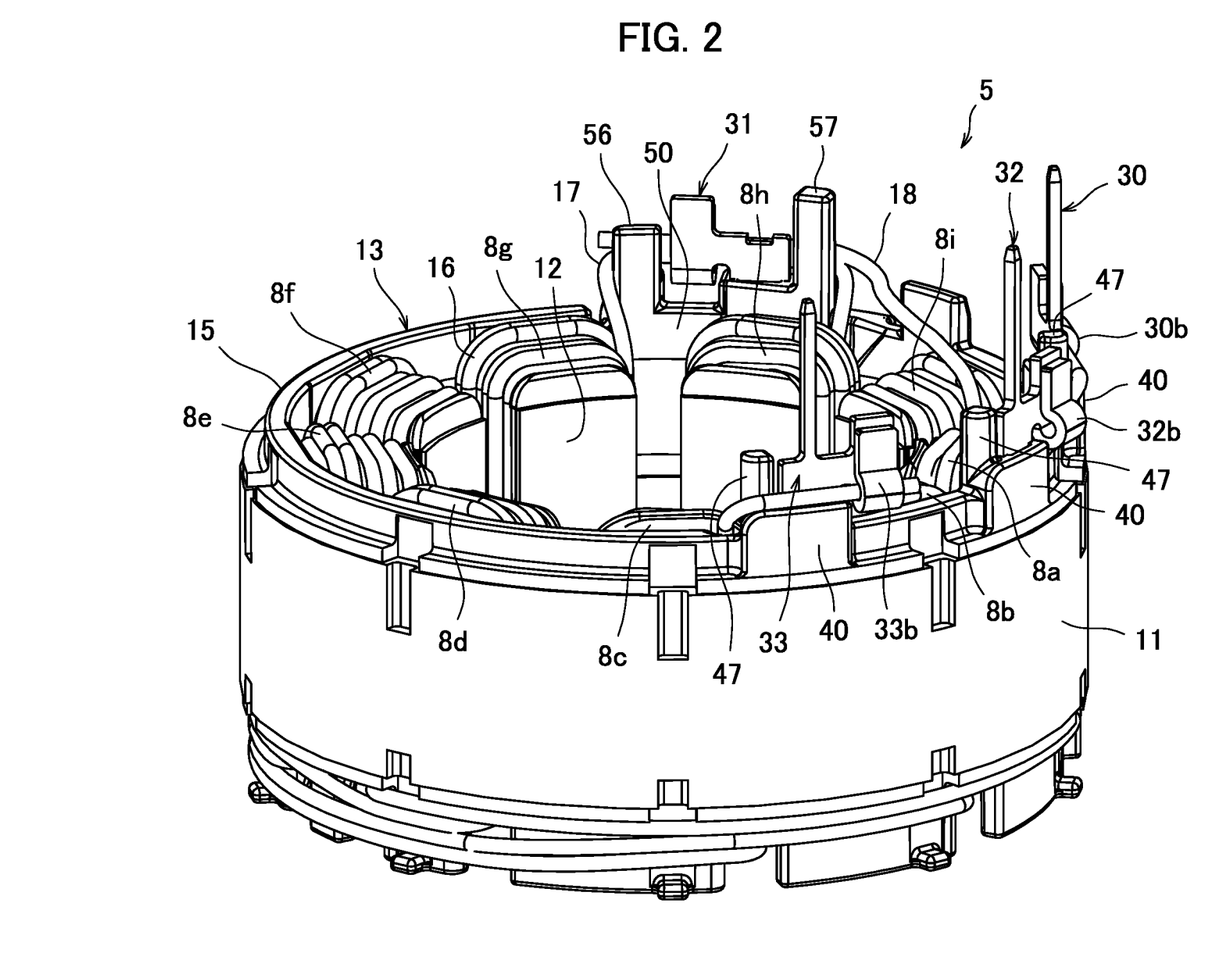
FIG. 2 is a perspective view illustrating a structure of a stator of a motor unit.

FIG. 2 is a perspective view illustrating a structure of the stator 5 of the motor unit 3.

As illustrated in FIG. 2, the stator 5 includes a tubular yoke 11, tooth main body portions 12 included on an inner circumferential side of the yoke, and an insulator 13 included on an inner circumferential surface of the yoke 11.

The tooth main body portions 12 are formed integrally with the yoke 11 and are formed of a magnetic body such as metal. The tooth main body portions 12 are in the form of columnar shapes projecting inward from the inner circumferential surface of the yoke 11, and nine tooth main body portions 12, for example, are included at equal intervals in the circumferential direction of the yoke 11.

The insulator 13 is formed of, for example, a resin and includes a tubular portion 15 formed into a tubular shape along the inner circumferential surface of the yoke 11 and nine bobbin portions 16 projecting inward from the inner circumferential surface of the tubular portion and covering the surroundings of the tooth main body portions 12.

Windings (coil wires 17, 18) that are covered wires are wound in the bobbin portions 16 of the insulator 13, and coils 8 (8a to 8i) are thereby formed. In other words, nine coils 8a to 8i disposed at equal intervals of 40 degrees in the circumferential direction and including the magnetic tooth main body portions 12 therein are formed inside the tubular yoke 11.

There are three coils 8 for each of a V phase, a U phase, and a W phase, such as coils 8a, 8d, 8g around which a V-phase wire is wound, coils 8b, 8e, 8h around which a U-phase wire is wound, and coils 8c, 8f, 8i around which a W-phase wire is wound. The coils 8 are disposed in an aligned manner in the circumferential direction in the order of the V phase, the U phase, and the W phase.

The coil wires 17, 18 are wound in each bobbin portion 16 of the insulator 13 provided at the stator 5 by a known winding machine, for example, when the stator 5 is manufactured.

Figure 3:
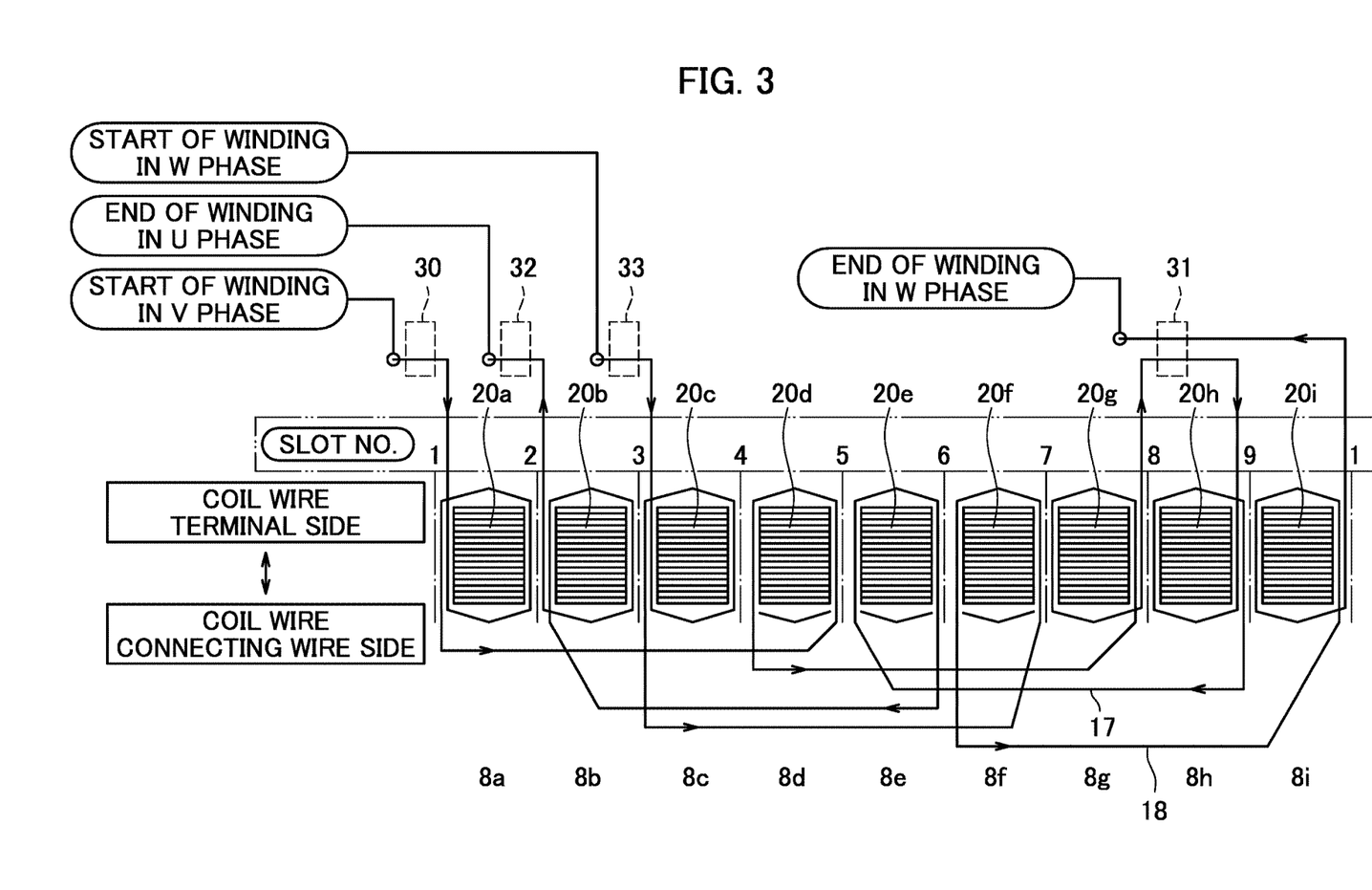
FIG. 3 is a connection diagram of coil wires to be wound in coils of the motor unit.

FIG. 3 is a connection diagram of the coil wires 17, 18 wound in the coils 8a to 8i of the motor unit 3. Note that the arrows at the coil wires 17, 18 illustrated in FIG. 3 indicate directions around which the coil wires 17, 18 are wound.

As illustrated in FIG. 3, the coil wires 17, 18 wound in the nine coils 8a to 8i include a first coil wire 17 serving as a V phase and a U phase and a second coil wire 18 serving as a W phase.

Note that connection of the following coil wires 17, 18 (winding around teeth 20a to 20i) will be described below by regarding, as teeth 20 (coil wound portions), the tooth main body portions 12 and the bobbin portions 16 serving as the coils 8 with the coil wires 17, 18 wound therein and by applying numbers of first to ninth teeth (20a to 20i) in order in the circumferential direction. Note that the ninth tooth 20i is provided with the first tooth 20a side by side on a side opposite to the eighth tooth 20h. Also, a space between adjacent ones of the teeth 20a to 20i serves as a slot. The spaces will be referred to as slot Nos. 1 to 9 in order, such as a slot No. 1 for the space between the first tooth 20a and the ninth tooth 20i and a slot No. 2 for the space between the first tooth 20a and the second tooth 20b.

First, one end of the first coil wire 17 is fixed with a jig, which is not illustrated, at a position in the circumferential direction on the side of the ninth tooth 20i in the vicinity of the slot No. 1 and a position on the outer circumferential side of the yoke 11. Additionally, the first coil wire 17 is pulled out of the winding machine, is locked by and electrically connected to a V-phase end terminal 30 (and end connection terminal, a connection terminal) fixed to the upper surface of the tubular portion 15 of the insulator 13 as will be described later, enters the slot No. 1 from the upper side (the side of the coil wire terminal), and is wound around the first tooth 20a. After the first coil wire 17 is wound around the first tooth 20a, the first coil wire 17 is pulled downward (the side of the coil wire connecting wire) out of the slot No. 1, is routed in the circumferential direction along a wall surface of the tubular portion 15 below the teeth 20a to 20d, enters the slot No. 5 from the lower side, and is wound around the fourth tooth 20d. After the first coil wire 17 is wound around the fourth tooth 20d, the first coil wire 17 is pulled downward out of the slot No. 4, is routed in the circumferential direction below the teeth 20d to 20g, enters the slot No. 8 from the lower side, and is wound around the seventh tooth 20g. Moreover, after winding around the seventh tooth 20g ends, the first coil wire 17 is pulled upward out of the slot No. 8 and is locked by and electrically connected to an intermediate terminal 31 (an intermediate connection terminal, a connection terminal) fixed to the upper surface of the tubular portion 15 of the insulator 13 in the vicinity of the eighth tooth 20h as will be described later. Furthermore, the first coil wire 17 is pulled out and is similarly wound around the eighth tooth 20h, the fifth tooth 20e, and the second tooth 20b in this order. After the winding around the second tooth 20b ends, the first coil wire 17 is pulled upward out of the slot No. 2 and is locked by and electrically connected to a U-phase end terminal 32 (an end connection terminal, a connection terminal) fixed to the upper surface of the tubular portion 15 at a position in the circumferential direction on the side of the first tooth 20a in the vicinity of the slot No. 2 as will be described later. In this manner, the V-phase coils 8a, 8d, 8g and the U-phase coils 8h, 8e, 8b are formed.

Also, one end of the second coil wire 18 is fixed with a jig, which is not illustrated, at a position in the circumferential position on the side of the second tooth 20b in the vicinity of the slot No. 3 and a position on the outer circumferential side of the yoke 11. Then, the second coil wire 18 is pulled out of the winding machine, is locked by and electrically connected to a W-phase end terminal 33 (an end connection terminal, a connection terminal) fixed to the upper surface of the tubular portion 15 of the insulator 13 as will be described later, enters the slot No. 3 from the upper side, and is wound around the third tooth 20c. After the second coil wire 18 is wound around the third tooth 20c, the second coil wire 18 is pulled downward out of the slot No. 3, is routed in the circumferential direction, and is wound around the sixth tooth 20f and the ninth tooth 20i in this order. Moreover, after the winding around the ninth tooth 20i ends, the second coil wire 18 is pulled upward out of the slot No. 1 and is locked by and electrically connected to the intermediate terminal 31. In this manner, the W-phase coils 8c, 8f, 8i are formed.

Figure 4:
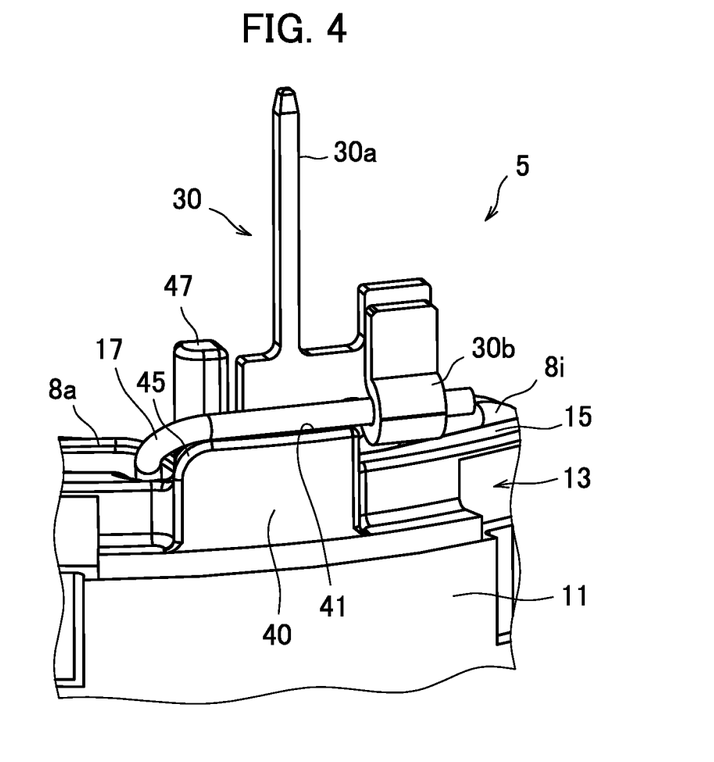
FIG. 4 is a perspective view illustrating a structure of the stator in the vicinity of a portion where a V-phase end terminal is mounted.
Figure 5:
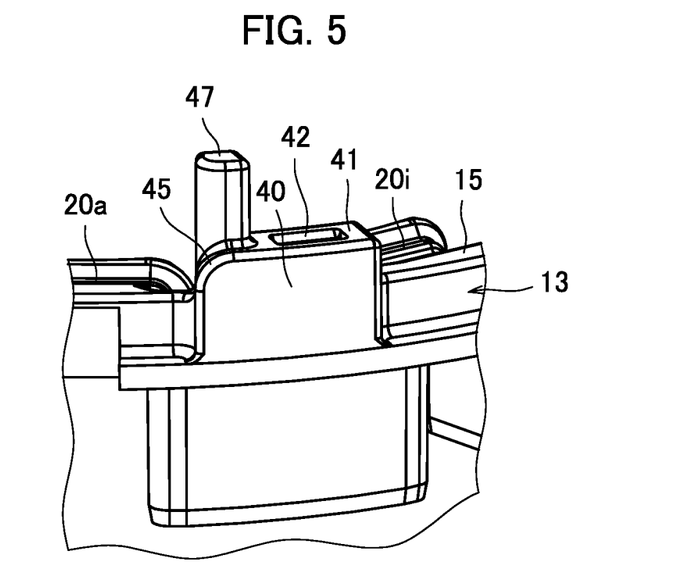
FIG. 5 is a perspective view illustrating a structure of an insulator in the vicinity of the portion where the V-phase end terminal is mounted.

FIG. 4 is a perspective view illustrating a structure of the stator 5 in the vicinity of the portion where the V-phase end terminal 30 is mounted. FIG. 5 is a perspective view illustrating a structure of the insulator 13 in the vicinity of the portion where the V-phase end terminal 30 is mounted.

As illustrated in FIGS. 4 and 5, the upper end surface of the tubular portion 15 of the insulator 13 includes, from the end of the first tooth 20a in the circumferential direction on the side of the ninth tooth 20i to the ninth tooth 20i, an end terminal base portion 40 projecting upward.

The end terminal base portion 40 has a length in the circumferential direction of about 1 cm to 2 cm, for example, which is shorter than the width of the tooth 20 in the circumferential direction, and has a width in the radial direction that is slightly longer than the diameter of the coil wire 17. An upper surface 41 of the end terminal base portion 40 is perpendicular to the axial line of the tubular portion 15, and the upper end on the side of the first tooth 20a in the circumferential direction is circularly chamfered (chamfered portion 45).

The upper surface of the end terminal base portion 40 on the side of the first tooth 20a includes a columnar-shaped first guide portion 47 projecting upward by about 1 cm to 2 cm, for example. The side surface of the end terminal base portion 40 on the side of the first tooth 20a (that is, on the side of the chamfered portion 45) and the side surface of the first guide portion 47 on the side of the first tooth 20a are substantially at the same position in the circumferential direction.

Also, the side surface of the first guide portion 47 on the outermost side in the radial direction has a distance corresponding to the diameter of the first coil wire 17 on the side further inward in the radial direction than the outer end of the end terminal base portion 40 in the radial direction. Note that the radial direction described here is a radial direction of the tubular portion 15.

The upper surface 41 of the end terminal base portion 40 is located on the side further upward than the coil 8a.

The upper surface 41 of the end terminal base portion 40 is provided with an insertion hole 42 into which the lower end of the V-phase end terminal 30 is inserted. The insertion hole 42 is disposed on the side of the ninth tooth 20i (on the side opposite to the chamfered portion 45) to be adjacent to the first guide portion 47.

The V-phase end terminal 30 is formed of a flat conductive metal plate, includes, at the lower end thereof, a projecting insertion portion which is inserted into the insertion hole 42 although not illustrated in the drawing, and includes an extending portion 30a that extends upward and has an upper end connected to a substrate of the control unit 7 disposed above the stator 5. Also, a hook portion 30b that locks the first coil wire 17 at the position extending in the circumferential direction beyond an end surface of the end terminal base portion 40 on the side of the ninth tooth 20i (on the side opposite to the chamfered portion 45) when the V-phase end terminal 30 is inserted into the insertion hole 42 and the V-phase end terminal 30 is fixed to the tubular portion 15 is included. The hook portion 30b is formed into a substantially U shape opening upward.

Also, the inner bottom surface of the hook portion 30b and the upper surface 41 of the end terminal base portion 40 are at substantially the same position in the up-down direction, and a width in which the first coil wire 17 can be placed is provided between the surface of the V-phase end terminal 30 except for the hook portion 30b on the outer circumferential side and the outer circumferential end of the upper surface 41 of the end terminal base portion 40 when the V-phase end terminal 30 is mounted on the tubular portion 15 of the insulator 13.

Note that the structures of the U-phase end terminal 32 and the support portion thereof (the end terminal base portion 40) and the structures of the W-phase end terminal 33 and the support portion thereof have the same shapes as those of the structures of the V-phase end terminal 30 and the support portion thereof. The U-phase end terminal 32 is disposed from the second tooth 20b to the first tooth 20a, the W-phase end terminal 33 is disposed from the third tooth 20c to the second tooth 20b, the end terminal base portion 40 serving as the support portion of the U-phase end terminal 32 and the end terminal base portion 40 serving as the support portion of the W-phase end terminal 33 are disposed with deviation of 40 degrees in the circumferential direction of the tubular portion 15 from the end terminal base portion 40 serving as the support portion of the V-phase end terminal 30.

Figure 6:
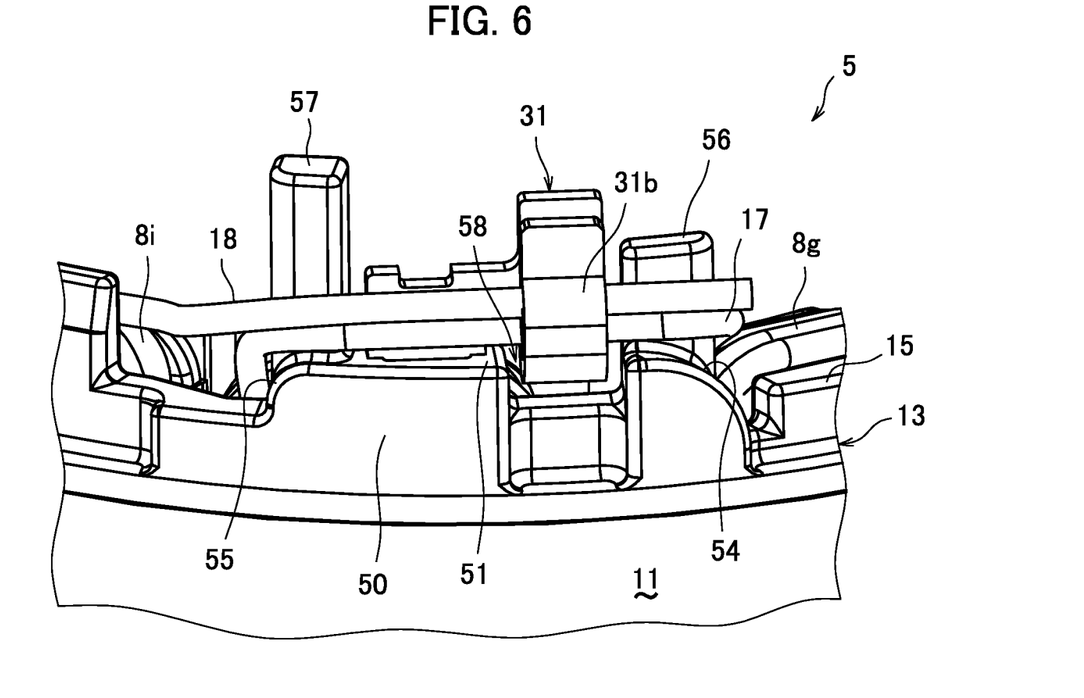
FIG. 6 is a perspective view illustrating a structure of the stator in the vicinity of a portion where an intermediate terminal is mounted.
Figure 7:
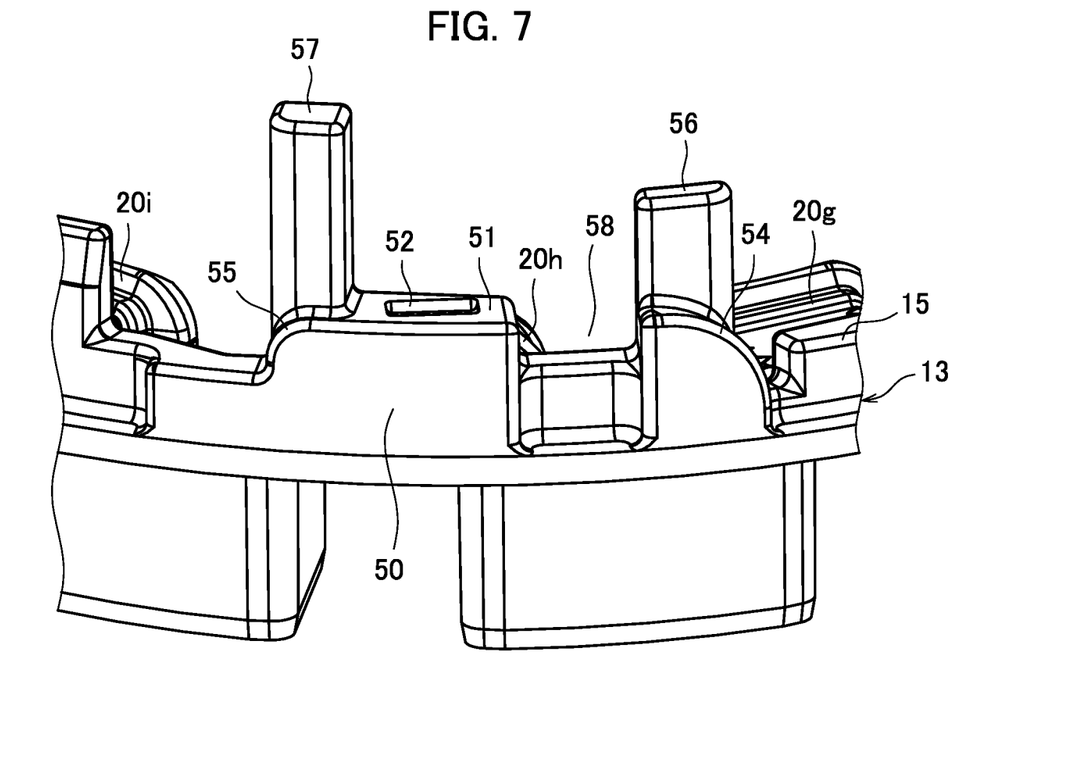
FIG. 7 is a perspective view illustrating a structure of the insulator in the vicinity of a portion where the intermediate terminal is mounted.

FIG. 6 is a perspective view illustrating a structure of the stator 5 in the vicinity of the portion where the intermediate terminal 31 is mounted. FIG. 7 is a perspective view illustrating a structure of the insulator 13 in the vicinity of the portion where the intermediate terminal 31 is mounted.

As illustrated in FIGS. 6 and 7, the upper end surface of the tubular portion 15 of the insulator 13 includes an intermediate terminal base portion 50 projecting upward at a position in the circumferential direction that is adjacent to the eighth tooth 20*h*.

The intermediate terminal base portion 50 has substantially the same position in the circumferential direction and substantially the same width in the circumferential direction as those of the eighth tooth 20*h*, and the width thereof in the radial direction is slightly larger than the diameter of the coil wires 17, 18. An upper surface 51 of the intermediate terminal base portion 50 is perpendicular to the axial line of the tubular portion 15, and the upper ends on both sides in the circumferential direction are circularly chamfered (chamfered portions 54, 55).

The upper surface of the intermediate terminal base portion 50 includes a second guide portion 56 and a third guide portion 57 with columnar shapes projecting upward. The second guide portion 56 projects upward by about 1 cm to 2 cm, for example, from the upper surface 51 of the intermediate terminal base portion 50. The third guide portion 57 projects upward by about 2 cm to 3 cm, for example, to be higher than the second guide portion 56 from the upper surface 51 of the intermediate terminal base portion 50.

The side surface of the intermediate terminal base portion 50 on the side of the seventh tooth 20*g* (that is, on the side of the chamfered portion 54) and the side surface of the second guide portion 56 on the side of the seventh tooth 20*g* are at substantially the same position in the circumferential direction.

Also, the side surface of the intermediate terminal base portion 50 on the side of the ninth tooth 20*i* (that is, on the side of the chamfered portion 55) and the side surface of the third guide portion 57 on the side of the ninth tooth 20*i* are at substantially the same position in the circumferential direction.

Additionally, both the side surface of the second guide portion 56 on the outermost side in the radial direction and the side surface of the third guide portion 57 on the outermost side in the radial direction have a distance corresponding to the diameter of the coil wires 17, 18 on the side further inward in the radial direction than the outer end of the intermediate terminal base portion 50 in the radial direction.

The upper surface 51 of the intermediate terminal base portion 50 is located slightly above the coils 8*i* and 8*g*.

The upper surface 51 of the intermediate terminal base portion 50 includes an insertion hole 52 into which the lower end of the intermediate terminal 31 is inserted. The insertion hole 52 is disposed to be adjacent to the third guide portion 57 between the second guide portion 56 and the third guide portion 57. Also, the upper surface 51 of the intermediate terminal base portion 50 includes a recessed portion 58 that is recessed downward between the insertion hole 52 and the second guide portion 56.

The intermediate terminal 31 is formed of a flat conductive metal plate and includes, at a lower end thereof, a projecting insertion portion that is inserted into the insertion hole 52 although not illustrated in the drawing. Also, a hook portion 31*b* that locks the coil wires 17 and 18 is included at the same position as that of the recessed portion 58 in the circumferential direction when the insertion portion of the intermediate terminal 31 is inserted into the insertion hole 52 and the intermediate terminal 31 is fixed to the tubular portion 15. The hook portion 31*b* is formed into a substantially U shape opening upward and has a depth in the up-down direction allowing the two coil wires 17, 18 to be locked.

Also, the inner bottom surface of the hook portion 31*b* and the upper surface 51 of the intermediate terminal base portion 50 are at substantially the same position in the up-down direction, and a width in which at least one of the coil wires 17, 18 can be mounted is provided between the surface of the intermediate terminal 31 except for the hook portion 31*b* on the outer circumferential side and the outer circumferential end of the upper surface 51 of the intermediate terminal base portion 50 when the intermediate terminal 31 is mounted on the tubular portion 15 of the insulator 13.

Next, a start and an end of winding of the coil wires 17, 18 of each phase (the V phase, the U phase, the W phase) in the stator 5 with the configuration as described above will be described in detail.

(Start of Winding in V Phase)

First, in a case where winding of the first coil wire 17 serving as a V-phase wire around the first tooth 20*a* is started, one end of the first coil wire 17 is fixed with a jig, the first coil wire 17 is pulled out of the winding machine and is caused to pass through the hook portion 30*b* of the V-phase end terminal 30 fixed to the tubular portion 15 from the upper side, is locked by and electrically connected to the hook portion 30*b*, and the first coil wire 17 is placed on the upper surface 41 of the end terminal base portion 40 first as described above. Moreover, the first coil wire 17 is brought into contact with the side surface of the first guide portion 47 while being pulled out, is pulled out toward the slot No. 1 on the inner side in the radial direction and on the lower side with the contact point caused to serve as a support point, and is wound around the first tooth 20*a*.

(End of Winding in V-Phase, Start of Winding in U-Phase)

After the first coil wire 17 is wound in order of the first tooth 20*a*, the fourth tooth 20*d*, and the seventh tooth 20*g*, the first coil wire 17 is pulled from the part above the slot No. 8 between the seventh tooth 20*g* and the eighth tooth 20*h* to the outside of the tubular portion 15, is brought into contact with the side surface of the second guide portion 56 on the side of the seventh tooth 20*g*, and is pulled in the circumferential direction toward the side of the third guide portion 57 with the contact point caused to serve as a support point, and the first coil wire 17 is locked by and electrically connected to the hook portion 31*b* of the intermediate terminal 31 and is placed on the upper surface 51 of the intermediate terminal base portion 50. In this manner, the winding of the V-phase wire ends.

Furthermore, the first coil wire 17 is brought into contact with the side surface of the third guide portion 57 on the side of the ninth tooth 20*i*, is pulled out toward the slot No. 9 on the inner side in the radial direction and on the lower side with the contact point caused to serve as a support point, and is wound around the eighth tooth 20*h*. Note that the first coil wire 17 pulled out after the portion locked with the intermediate terminal 31 serves as a U-phase wire.

(End of Winding in U Phase)

The first coil wire 17 is wound in order of the eighth tooth 20*h*, the fifth tooth 20*e*, and the second tooth 20*b*, and the first coil wire 17 after the winding around the second tooth 20*b* ends is pulled upward and outward in the radial direction from the slot No. 2 between the first tooth 20*a* and the second tooth 20*b*. Then, the first coil wire 17 is brought into contact with the side surface of the first guide portion 47 of the end terminal base portion 40 on the side of the second tooth 20*b* to which the U-phase end terminal 32 is fixed, is pulled out to the side of the first tooth 20*a* with the contact point caused to serve as a support point, and is placed on the upper surface 41 of the end terminal base portion 40 to which the U-phase end terminal 32 is fixed. Also, the first coil wire 17 is locked by and electrically connected to the hook portion 32b of the U-phase end terminal 32, and an excess part of the end of the first coil wire 17 is then cut. Note that illustration of the connecting location of the first coil wire 17 to the U-phase end terminal 32, that is, the part where winding of the first coil wire 17 in the U-phase ends is omitted.

(Start of Winding in W-Phase)

The second coil wire 18 serving as a W-phase wire is connected to a hook portion 33b of the W-phase end terminal 33, the winding thereof is started from the third tooth 20c, and it is only necessary to start the winding thereof similarly to the first coil wire 17 serving as the V-phase wire.

(End of Winding in W Phase)

The second coil wire 18 is wound in order of the third tooth 20c, the sixth tooth 20f, and the ninth tooth 20i, and the second coil wire 18 after the winding around the ninth tooth 20i ends is pulled upward and outward in the radial direction from the slot No. 1 between the ninth tooth 20i and the first tooth 20a. Then, the second coil wire 18 is brought into contact with the side surface of the third guide portion 57 provided at the intermediate terminal base portion 50 on the side of the ninth tooth 20i, is pulled out on the side of the seventh tooth 20g with the contact point caused to serve as a support point, and is placed on the upper surface 51 of the intermediate terminal base portion 50. Then, the second coil wire 18 is locked by and electrically connected to the hook portion 31b of the intermediate terminal 31, and an excess part of the end of the second coil wire 18 is then cut.

In this manner, the first coil wire 17 and the second coil wire 18 are electrically connected at the intermediate terminal 31.

With the configuration as described above, the motor unit 3 of the electric pump device 1 including the stator 5 that employs the coil winding portion structure according to the embodiment includes three coils for each of the U phase, the V phase, and the W phase, namely a total of nine coils 8 (8a to 8i). Also, the stator 5 of the motor unit 3 includes the insulator 13 for insulating the coils 8.

The insulator 13 includes the bobbin portions 16 for the teeth 20a to 20i around which the coil wires 17, 18 are wound and the tubular portion 15 provided outside the bobbin portions 16 in the radial direction.

The tubular portion 15 of the insulator 13 according to the embodiment includes load receiving portions such as the base portions (the end terminal base portion 40, the intermediate terminal base portion 50) and the guide portions (the first guide portion 47, the second guide portion 56, the third guide portion 57) receiving a load of the coil wires 17, 18 when the coil wires 17, 18 are wound around the teeth 20a to 20i at the time of manufacturing the stator 5.

It is thus possible to apply a large tensile force to the coil wires 17, 18 and to strongly perform winding at the time of the winding around the teeth 20a to 20i.

Particularly, the base portions 40, 50 are provided at the upper end of the tubular portion 15, and it is possible to hold the coil wires 17, 18 such that they extend in the circumferential direction along the tubular portion 15 by pushing the coil wires 17, 18 against the upper surfaces 41, 51 thereof. It is thus possible to hold the coil wires 17, 18 while defining the positions thereof in the axial direction and the circumferential direction with respect to the tubular portion 15.

Also, since the guide portions 47, 56, 57 are provided at the ends of the base portions 40, 50 in the circumferential direction, it is possible to hold the coil wires 17, 18 by pushing them against the guide portions 47, 56, 57 and to strongly wind the coil wires 17, 18 around the teeth 20a to 20i when the coil wires 17, 18 are bent and guided between the base portions 40, 50 and the teeth 20a to 20i and the winding of the coil wires 17, 18 around the teeth 20a to 20i is started, or when the coil wires 17, 18 after winding around the teeth 20a to 20i ends is pulled out. Also, it is possible to reduce a load to be applied to the terminals 30 to 33 and to protect the terminals 30 to 33 by the base portions 40, 50 and the guide portions 47, 56, 57 holding the coil wires 17, 18 when the coil wires 17, 18 are connected to the terminals (the V-phase end terminal 30, the intermediate terminal 31, the U-phase end terminal 32, the W-phase end terminal 33).

Additionally, since the base portions 40, 50 and the guide portions 47, 56, 57 are disposed at the upper end of the tubular portion 15 in an aligned manner in the circumferential direction, it is possible to configure the load receiving portions receiving a load of the coil wires 17, 18 in a compact size when the coil wires 17, 18 are wound around the teeth 20a to 20i. Moreover, since the base portions 40, 50 and the guide portions 47, 56, 57 are configured integrally with the tubular portion 15, it is possible to reduce the number of components.

Additionally, the terminals 30 to 33 that are connection terminals connected to the coil wires 17, 18 are supported by the base portions 40, 50, the hook portions 30b, 31b, 32b, 33b that are connecting portions between the terminals 30 to 33 and the coil wires 17, 18 are disposed to be adjacent to the base portions 40, 50, these are also disposed at the upper end of the tubular portion 15 in an aligned manner in the circumferential direction, and it is thus possible to form the structure of the parts where the terminals 30 to 33 are mounted in a compact size by reducing the projection thereof on the outer side in the radial direction from the tubular portion 15.

As described above, a load to be applied to the terminals 30 to 33 is reduced by the guide portions 47, 56, 57 holding the coil wires 17, 18 as described above, and it is thus possible to form the terminals 30 to 33 into thin plate shapes and to form the structure where they are mounted in a compact size.

In the present embodiment, the first coil wire 17 forming the V-phase and U-phase coils 8a, 8b, 8d, 8e, 8g, 8h and the second coil wire 18 forming the W-phase coils 8c, 8f, 8i are included, the terminals connected to the coil wires 17, 18 include the three end terminals (the V-phase end terminal 30, the U-phase end terminal 32, the W-phase end terminal 33) individually locking one end of the first coil wire 17, the other end of the first coil wire 17, and one end of the second coil wire 18 and the one intermediate terminal 31 locking the intermediate portion of the first coil wire 17 and the other end of the second coil wire 18, and the three end terminals 30, 32, 33 and the intermediate terminal 31 are disposed at the tubular portion 15 at different positions in the circumferential direction.

It is thus possible to configure the stator 5 of the three-phase motor including a total of nine coils 8a to 8i such that the stator 5 does not project outward in the radial direction from the tubular portion 15 by winding the first coil wire 17 and the second coil wire 18 around the nine teeth 20a to 20i and connecting the first coil wire 17 and the second coil wire 18 to the three end terminals 30, 32, 33 and the intermediate terminal 31.

Additionally, since the base portions 40, 50 are provided at the respective positions where the three end terminals 30, 32, 33 and the intermediate terminal 31 are mounted, it is possible to configure the base portions 40, 50 such that they can appropriately support the coil wires 17, 18 to be connected to each of the terminals 30 to 33.

Particularly, since the intermediate terminal base portion 50 where the intermediate terminal 31 is provided includes the guide portions (the second guide portion 56, the third guide portion 57) on both sides of the hook portion 31*b* that is the connecting position between the intermediate terminal 31 and the first coil wire 17 in the circumferential direction with the hook portion 31*b* sandwiched therebetween, it is possible to apply a large tensile force to the first coil wire 17 and to strongly wind the first coil wire 17 both at the end of the winding in the V phase and at the start of the winding in the U phase of the first coil wire 17.

Also, the first coil wire 17 is connected to the intermediate terminal 31 first, and the second coil wire 18 is then connected thereto. The third guide portion 57 out of the second guide portion 56 and the third guide portion 57 provided at the intermediate terminal base portion 50 guides not only the first coil wire 17 but also the second coil wire 18. Additionally, since the third guide portion 57 has a longer projecting length than the second guide portion 56, it is possible to easily hook the second coil wire 18 on the third guide portion 57 and to guide it to the intermediate terminal 31 after connection of the first coil wire 17.

Although the description of the embodiment will end here, aspects of the present invention are not limited to the above embodiment. For example, the number of coils 8 in each of the U phase, the V phase, and the W phase may be any number other than three.

Also, although the present invention has been applied to the stator 5 of the motor unit 3 in the electric pump device 1 in the above embodiment, it is also possible to widely apply the invention of the present application to electric motors other than the electric pump.

REFERENCE SIGNS LIST

- 3 Motor unit
- 5 Stator
- 6 Rotor
- 8 (8*a* to 8*i*) Coil
- 13 Insulator
- 15 Tubular portion
- 17 First coil wire (winding)
- 18 Second coil wire (winding)
- 20 (20*a* to 20*i*) Tooth (coil wound portion)
- 30 V-phase end terminal (end connection terminal, connection terminal)
- 31 Intermediate terminal (intermediate connection terminal, connection terminal)
- 32 U-phase end terminal (end connection terminal, connection terminal)
- 33 W-phase end terminal (end connection terminal, connection terminal)
- 40 End terminal base portion (base portion, load receiving portion)
- 47 First guide portion (guide portion, load receiving portion)
- 50 Intermediate terminal base portion (base portion, load receiving portion)
- 56 Second guide portion (guide portion, load receiving portion)
- 57 Third guide portion (guide portion, load receiving portion)

What is claimed is:

1. A coil winding portion structure for a stator in an electric motor that includes the stator including coils with windings wound therein, a rotor rotatably disposed inside the stator, and an insulator attached to the stator for insulating the coils, wherein the insulator includes a coil wound portion around which the windings are wound, and a tubular portion provided outside the coil wound portion in a radial direction, connection terminals to which the windings are connected being mounted on the tubular portion, the tubular portion includes, between the coils and the connection terminals, a load receiving portion receiving a load of the windings when the windings are wound in the coils, the load receiving portion includes base portions that extend along a part of the tubular portion in a circumferential direction, project axially outward from the tubular portion and have upper surfaces being perpendicular to an axial line of the tubular portion, the upper surfaces holding the windings mounted thereon, and guide portions that protrude axially from the base portions and are in the form of columnar shapes, bending and guiding the windings while supporting the tension of the windings, the base portions and the guide portions are configured integrally with the tubular portion, the connection terminals, the base portions, and the guide portions are disposed at an end of the tubular portion in an axial direction in an aligned manner in the circumferential direction.

2. The coil winding portion structure for a stator according to claim 1, wherein the guide portions and the base portions are disposed in order from a side of the coil wound portion between the coil wound portion and the connection terminals at positions in the circumferential direction of the tubular portion.

3. The coil winding portion structure for a stator according to claim 2, wherein the base portions and the guide portions are configured integrally with the tubular portion, and the connection terminals are supported at the end of the tubular portion in the axial direction.

4. The coil winding portion structure for a stator according to claim 3, wherein the coils include V-phase, U-phase, and W-phase coils, the windings include a first coil wire forming the V-phase and U-phase coils and a second coil wire forming the W-phase coils, the connection terminals include three end connection terminals individually locking one end of the first coil wire, the other end of the first coil wire, and one end of the second coil wire, and one intermediate connection terminal locking an intermediate portion of the first coil wire and the other end of the second coil wire, and the three end connection terminals and the intermediate connection terminal are disposed at the tubular portion at different positions in the circumferential direction.

5. The coil winding portion structure for a stator according to claim 4, wherein the base portions are provided at respective positions where the three end connection terminals and the intermediate connection terminal are mounted.

6. The coil winding portion structure for a stator according to claim 5, wherein the base portion where the intermediate connection terminal is mounted includes the guide portions on both sides of a connecting position between the intermediate connection terminal and the first coil wire in the circumferential direction with the connecting position sandwiched therebetween.

7. The coil winding portion structure for a stator according to claim 6,
wherein the guide portions are formed into columnar shapes projecting in the axial direction of the tubular portion from the base portions, and
one of the two guide portions provided at the base portion where the intermediate connection terminal is mounted has a longer projecting length than the other.

8. The coil winding portion structure for a stator according to claim 2,
wherein the coils include V-phase, U-phase, and W-phase coils,
the windings include a first coil wire forming the V-phase and U-phase coils and a second coil wire forming the W-phase coils,
the connection terminals include three end connection terminals individually locking one end of the first coil wire, the other end of the first coil wire, and one end of the second coil wire, and one intermediate connection terminal locking an intermediate portion of the first coil wire and the other end of the second coil wire, and
the three end connection terminals and the intermediate connection terminal are disposed at the tubular portion at different positions in the circumferential direction.

9. The coil winding portion structure for a stator according to claim 8, wherein the base portions are provided at respective positions where the three end connection terminals and the intermediate connection terminal are mounted.

10. The coil winding portion structure for a stator according to claim 9, wherein the base portion where the intermediate connection terminal is mounted includes the guide portions on both sides of a connecting position between the intermediate connection terminal and the first coil wire in the circumferential direction with the connecting position sandwiched therebetween.

11. The coil winding portion structure for a stator according to claim 10,
wherein the guide portions are formed into columnar shapes projecting in the axial direction of the tubular portion from the base portions, and
one of the two guide portions provided at the base portion where the intermediate connection terminal is mounted has a longer projecting length than the other.

* * * * *